Figure 1:
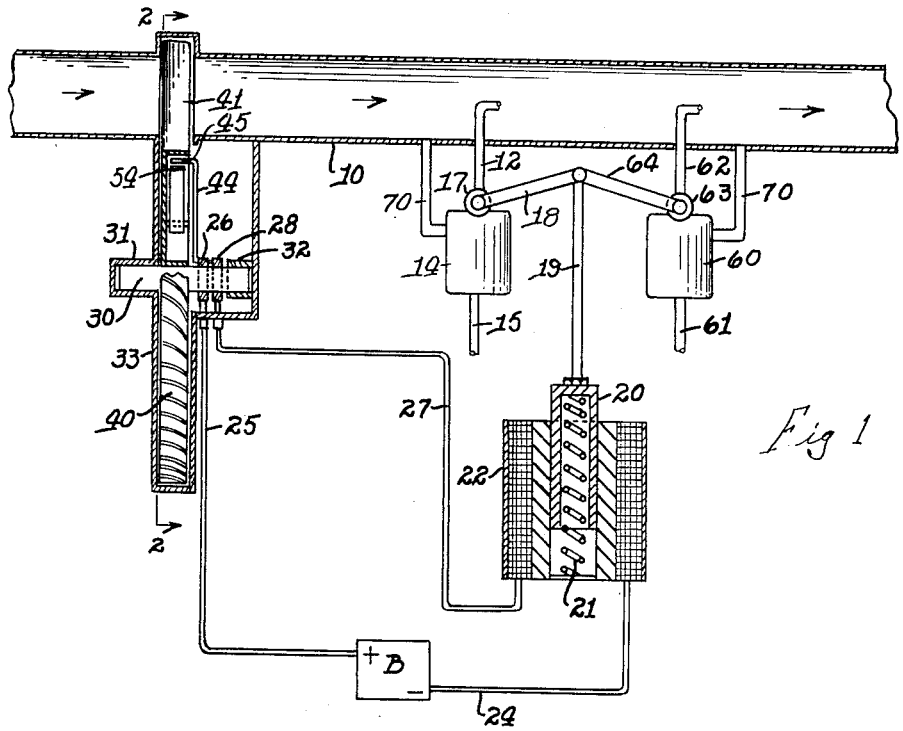

Aug. 15, 1950    R. H. GODDARD    2,518,880
MIXTURE CONTROL APPARATUS
Filed March 11, 1947

INVENTOR
ROBERT H. GODDARD, DEC'D.
ESTHER C. GODDARD, EXECUTRIX
BY
Chas. T. Hawley
ATTORNEY.

Patented Aug. 15, 1950

2,518,880

UNITED STATES PATENT OFFICE 2,518,880

MIXTURE CONTROL APPARATUS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application March 11, 1947, Serial No. 733,825

1 Claim. (Cl. 261—66)

This invention relates to combustion apparatus in which a gaseous mixture of fuel and oxidizer is fed to a combustion point. In certain such apparatus, a flash-back may occur if the gaseous mixture is not supplied at or above a predetermined minimum rate of travel.

It is the general object of this invention to control the mixture so that fuel will be added to the oxidizer in the supply pipe or conduit only when the oxidizer is moving through said pipe at or above a predetermined and essential minimum speed.

To the attainment of this general object, the fuel feed is controlled by a device, such as a turbine, which is directly responsive to the rate of flow of the oxidizer through the supply pipe toward the combustion point.

The invention further relates to arrangements and combinations of parts which will be hereinafter described and more particularly pointed out in the appended claim.

A preferred form of the invention is shown in the drawings, in which

Figure 2:
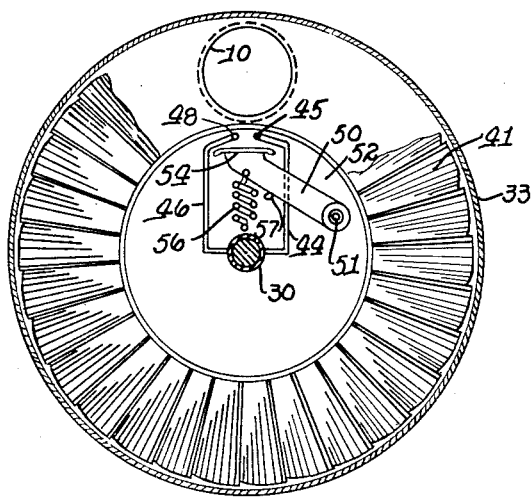

Fig. 1 is a sectional side elevation of the improved mixture control apparatus; and Fig. 2 is a transvere sectional elevation, taken along the line 2—2 in Fig. 1.

Referring to Fig. 1, a supply pipe or conduit 10 receives a stream of oxygen gas or other oxidizer under pressure at the left-hand end of the pipe 10, and the gas flows from the right-hand end of the pipe to a combustion chamber or other combustion point where the gas mixture is consumed.

Vaporized fuel is supplied through a pipe 12 from a carburetor 14 which receives gasoline or other liquid fuel through a feed pipe 15. The flow of gaseous fuel through the pipe 12 is controlled by a valve 17 connected by an arm 18 and rod 19 to a solenoid plunger 20. This plunger is normally pressed upward by a coil spring 21 and is drawn downward when the solenoid coil 22 is energized.

The coil 22 is connected by a wire 24 to a battery B, which in turn is connected by a wire 25 to a brush engaging a collector ring 26. The other terminal of the coil 22 is connected by a wire 27 through a second brush to a second collector ring 28. The rings 26 and 28 are mounted on a shaft 30 rotatable in bearings 31 and 32 in a casing 33 forming a gas-tight receptacle fixed to and supported by the pipe or conduit 10. A turbine 40 is mounted on the shaft 30, and the turbine blades 41 pass through and across the pipe 10 at one point in their annular path.

The collector ring 26 is insulated from the shaft 30 but is connected by a wire 44 (Fig. 2) to a rod or terminal 45 fixed within the turbine 40. The second collector ring 28 is connected through a wire 46 to a second rod or terminal 48.

An arm 50 (Fig. 2) is pivoted at 51 on the hub portion 52 of the turbine and is provided with a contact plate 54 at its outer end. A light coil spring 56 normally holds the arm 50 against a stop pin 57.

When the turbine is at rest or running at slow speed, the circuit is broken between the terminals 45 and 48, so that the solenoid coil 22 is not energized and the valve 17 remains closed, shutting off the fuel supply to the pipe 10.

When the gaseous oxidizer flows through the pipe 10 at or above a selected rate of speed, the turbine 40 will be rotated fast enough to cause the arm 50 to swing outward by centrifugal force, thus completing the circuit between the terminals 45 and 48. The solenoid coil 22 is thus energized to open the valve 17 and to allow fuel to be fed to the pipe 10. Consequently, fuel is fed to the pipe 10 only when the oxygen gas or other oxidizer is flowing at or above a predetermined minimum rate through the pipe 10. At all lower rates of flow, the fuel supply is shut off.

If it is desired to add water or a second kind of fuel to the gaseous mixture, a second carburetor 60 may be provided with a feed pipe 61 and with a delivery pipe 62 controlled by a valve 63 connected by an arm 64 to the rod 19 previously described. The valves 17 and 63 are so designed that downward movement of the rod 19 will open both valves and upward movement will close both valves.

By-pass connections 70 may be made from the pipe 10 to the carburetors 14 and 60, so that the gaseous oxidizer under pressure may be fed to the carburetors 14 and 60 to accelerate carburation of the fuel in the carburetor 14 and evaporation of the water in the carburetor 60.

From the foregoing description it will be clear that the feed of fuel, with or without the addition of water vapor, will be automatically controlled by the flow of gaseous oxidizer through the pipe 10, and it will also be clear that neither fuel nor water vapor will be supplied unless the rate of flow of gaseous oxidizer in the pipe 10 is at or above a predetermined minimum. Consequently, danger of flash-back from the combustion point is effectively avoided.

Having thus described the invention and the advantages thereof, it will be understood that the invention is not to be limited to the details herein disclosed, otherwise than as set forth in the claim, but what is claimed is:

In a mixture control apparatus, a linear conduit through which a gaseous oxidizer flows in a continuous stream to a combustion point, a gas-tight casing mounted on and opening into said conduit, a turbine wheel mounted in said casing at one side of said conduit and having peripheral blades only projecting into and transversely across said conduit, a fuel carburetor having its delivery pipe extending into said conduit at a point spaced from said turbine wheel and casing in the direction of flow in said conduit and said delivery pipe being open at its end in said conduit, a valve for said delivery pipe, a solenoid to open said valve, a spring to close said valve, a centrifugal circuit-closing device rotatable with said turbine wheel and eccentrically mounted thereon, an operating circuit for said solenoid which is opened and closed by said centrifugal circuit-closing device on said turbine wheel, and a by-pass connection from said conduit to said carburetor to accelerate vaporization in said carburetor.

ESTHER C. GODDARD.
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,085,194 | Bussian et al. | Jan. 27, 1914 |
| 1,092,079 | Reeder | Mar. 31, 1914 |
| 1,111,763 | Rogers | Sept. 29, 1914 |
| 1,676,828 | Howard et al. | July 10, 1928 |
| 2,082,514 | Robinson | June 1, 1937 |
| 2,252,416 | Schwarz | Aug. 12, 1941 |
| 2,392,565 | Anderson et al. | Jan. 8, 1946 |
| 2,394,283 | Yost | Feb. 5, 1946 |